(12) United States Patent
Bermudez Hernandez et al.

(10) Patent No.: US 10,601,907 B2
(45) Date of Patent: Mar. 24, 2020

(54) SYSTEM AND METHOD FOR PLATFORM TO SECURELY DISTRIBUTE COMPUTE WORKLOAD TO WEB CAPABLE DEVICES

(71) Applicants: Simon Adrian Bermudez Hernandez, Toronto (CA); Henning Dekant, Toronto (CA); Scott Horlacher, Toronto (CA)

(72) Inventors: Simon Adrian Bermudez Hernandez, Toronto (CA); Henning Dekant, Toronto (CA); Scott Horlacher, Toronto (CA)

(73) Assignee: Artiste QB Net Inc., Toronto (CA)

( * ) Notice: Subject to any disclaimer, the term of this patent is extended or adjusted under 35 U.S.C. 154(b) by 34 days.

(21) Appl. No.: 15/712,703

(22) Filed: Sep. 22, 2017

(65) Prior Publication Data
US 2019/0098080 A1    Mar. 28, 2019

(51) Int. Cl.
*H04L 12/00*    (2006.01)
*H04L 29/08*    (2006.01)
(Continued)

(52) U.S. Cl.
CPC ........ *H04L 67/1008* (2013.01); *G06F 9/4881* (2013.01); *G06F 9/505* (2013.01); *G06F 9/5083* (2013.01); *G06F 11/3428* (2013.01); *H04L 9/0662* (2013.01); *H04L 9/12* (2013.01); *H04L 9/3236* (2013.01); *H04L 9/3247* (2013.01); *H04L 63/1458* (2013.01);
(Continued)

(58) Field of Classification Search
CPC ............. H04L 67/1008; H04L 67/1029; H04L 9/3247; H04L 63/1458; G06F 9/5083; G06F 9/488; G06F 9/505; G06F 11/3428

USPC .................................. 709/226, 223, 234, 235
See application file for complete search history.

(56) References Cited

U.S. PATENT DOCUMENTS 5,317,744 A * 5/1994 Harwell .................. H04L 29/06
                                                                    703/21
6,134,664 A * 10/2000 Walker .................. G06F 21/552
                                                                    726/22
(Continued)

OTHER PUBLICATIONS

Sarmenta, "Bayanihan: Building and studying web-based volunteer computing systems using Java." Future Generation Computer Systems 15(5):675-686 (Nov. 5, 1998).
(Continued)

*Primary Examiner* — Frantz Coby
(74) *Attorney, Agent, or Firm* — Henry J. Cittone; Cittone Demers & Arneri LLP

(57) ABSTRACT

A method is disclosed for distributed computing using a plurality of web-enabled swarm devices. The method comprises: receiving, by a server platform, a workload request originating from a requestor, which workload request is associated with a workload; receiving, by the server platform, the workload associated with the workload request; splitting, by the server platform, the received workload into a group of subtasks; distributing the group of subtasks to the plurality of swarm devices; collecting, by the server platform, one or more result sets from the plurality of swarm devices based on performing of the group of subtasks by the swarm devices; assembling the one or more result sets into a computational result; and providing the requestor with the computational result.

24 Claims, 14 Drawing Sheets

(51) Int. Cl.
*G06F 9/50* (2006.01)
*H04L 29/06* (2006.01)
*G06F 11/34* (2006.01)
*H04L 9/32* (2006.01)
*G06F 9/48* (2006.01)
*H04L 9/06* (2006.01)
*H04L 9/12* (2006.01)

(52) U.S. Cl.
CPC ...... *H04L 67/1029* (2013.01); *H04L 2209/38* (2013.01); *H04L 2209/56* (2013.01)

(56) References Cited

U.S. PATENT DOCUMENTS

| | | | | |
|---|---|---|---|---|
| 7,587,749 | B2* | 9/2009 | Leser | H04L 9/08 726/1 |
| 8,719,576 | B2* | 5/2014 | Buldas | G06F 21/64 713/175 |
| 8,869,132 | B2* | 10/2014 | Srinivasa | G06F 9/466 717/171 |
| 8,959,217 | B2* | 2/2015 | Mayo | G06F 9/5077 709/226 |
| 9,122,846 | B2* | 9/2015 | Buldas | G06F 21/64 |
| 9,195,510 | B2* | 11/2015 | Hirschfeld | G06F 9/5044 |
| 9,355,135 | B2* | 5/2016 | Bhide | G06F 16/2272 |
| 9,817,850 | B2* | 11/2017 | Dubbels | G06F 16/27 |
| 2007/0006122 | A1* | 1/2007 | Bailey | G06F 8/61 717/101 |
| 2007/0156602 | A1* | 7/2007 | Fukao | G06F 8/61 705/57 |
| 2013/0080360 | A1* | 3/2013 | Sterritt | G05B 13/02 706/14 |
| 2013/0123981 | A1* | 5/2013 | Lee | H04W 4/02 700/248 |
| 2016/0359955 | A1* | 12/2016 | Gill | H04L 67/1097 |
| 2018/0027058 | A1* | 1/2018 | Balle | G06F 3/0613 709/226 |
| 2018/0302424 | A1* | 10/2018 | Bender | H04L 63/1425 |

OTHER PUBLICATIONS

Macwilliam, "Crowdcl: Web-based volunteer computing with webcl." High Performance Extreme Computing Conference (HPEC) Waltham, MA (Sep. 10-12, 2013).

Khan, "Using javascript and webcl for numerical computations: A comparative study of native and web technologies." ACM SIGPLAN Notices. 50(2):91-102 (Jun. 8, 2014).

Anderson, "SETI@ home: an experiment in public-resource computing." Communications of the ACM 45(11):56-61 (Nov. 1, 2002).

Anderson, "Boinc: A system for public-resource computing and storage." GRID '04 Proceedings of the 5th IEEE/ACM International Workshop on Grid Computing (Nov. 8, 2004).

* cited by examiner

SYSTEM AND METHOD FOR PLATFORM TO SECURELY DISTRIBUTE COMPUTE WORKLOAD TO WEB CAPABLE DEVICES

FIELD OF THE INVENTION

The present disclosure relates to methods and devices for distributing and managing computational workload across many computing resources in a safe and auditable manner.

BACKGROUND

Currently, the fastest growing sector of computational devices is web-enabled devices such as smartphones, tablets and video game consoles. Current state-of-the-art computational load distribution architectures, for instance, those implemented in cloud based environments, or on regular personal computers (PCs) for research initiatives require special purpose software to split up and distribute the computational tasks. An example of such a platform is the Berkeley Open Infrastructure for Network Computing (BOINC), which is used to run the Search for Extra Terrestrial Intelligence at home (SETI@home) project. Such software can take the form of a dedicated client-server schema, or a master and slave-node architecture as implemented in popular frameworks such as Hadoop or Apache Spark, as well as peer-to-peer techniques that, for instance, Bittorrent software implements. The effort required, and cost associated with, making such specialized apps available in device app stores, poses an obstacle to performing distributed computing using web-enabled devices in a swarm.

Other works of prior art detail the use of Java Applets or Web Computing Library (WebCL) for distributed computing application frameworks. Examples include:

Project Bayanihan, as detailed in Sarmenta, Luis F G, and Satoshi Hirano. "Bayanihan: Building and studying web-based volunteer computing systems using Java." Future Generation Computer Systems 15.5 (1999): 675-686;

The CrowdCL computing framework, as detailed in MacWilliam, Tommy, and Cris Cecka. "Crowdcl: Web-based volunteer computing with webcl." High Performance Extreme Computing Conference (HPEC), 2013 IEEE. IEEE, 2013;

Project Bayanihan and the CrowdCL computing framework suffer from some shortcomings. In both these frameworks, in that the owners of web-enabled devices have to volunteer their devices to participate. Therefore security is not a consideration. This is an obstacle to implementing a commercializable offering which utilizes computing devices for remote code execution.

All the works of prior art listed above utilize WebCL or Java Applets. WebCL is not readily available in many commercially available browsers today. While standards surrounding WebCL have been formulated, WebCL itself has not been readily adopted in browsers.

Java Applets on the other hand are a legacy technology that is no longer supported in current web browsers.

ECMAScript, also known as JavaScript, is built into commonly used web browsers such as, but not limited to, GOOGLE® Chrome, Mozilla Firefox or the Safari browser produced by APPLE®. While most browsers allow strict security settings that disable these scripting capabilities, by default the scripting capabilities are enabled. Only a very small percentage of users opt to disable the scripting capabilities, since they could otherwise not access the bulk of all current commercial as well as non-commercial web-sites. ECMAScript allows accessing advanced Application Program Interfaces (APIs) and emerging web standards such as, but not limited to, Web Graphics Library (WebGL) and WebAssembly. For example, currently WebGL and WebAssembly use ECMAScript to access low-level hardware accelerated primitives of a device's Graphical Processing Unit (GPU). This is especially useful since WebGL has been adopted as a standard in many commercially available browsers.

SUMMARY

A method is disclosed for distributed computing using a plurality of swarm devices, wherein said plurality of swarm devices is web-enabled; said method further comprising: receiving, by a server platform, a workload request originating from a requestor, wherein said workload request is associated with a workload; receiving, by the server platform, the workload associated with the workload request; splitting, by said server platform, the received workload into a group of subtasks; distributing said group of subtasks to the plurality of swarm devices; collecting, by said server platform, one or more result sets from the plurality of swarm devices based on performing of said group of subtasks by said swarm devices; assembling said one or more result sets into a computational result; and providing, by said server platform, said requestor with the computational result.

A server platform for distributed computing, wherein said server platform is coupled to a requestor and a plurality of swarm devices via a network, further wherein said plurality of swarm devices is web-enabled; and further wherein said server platform is configured to receive a workload request originating from the requestor, wherein said workload request is associated with a workload, receive the workload associated with the workload request, split the received workload into a group of subtasks, distribute the group of subtasks to the plurality of swarm devices, collect one or more result sets from the swarm of web-enabled devices based on performing of said group of subtasks by the swarm of web-enabled devices, assemble said one or more result sets into a computational result, and provide said requestor with the computational result.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
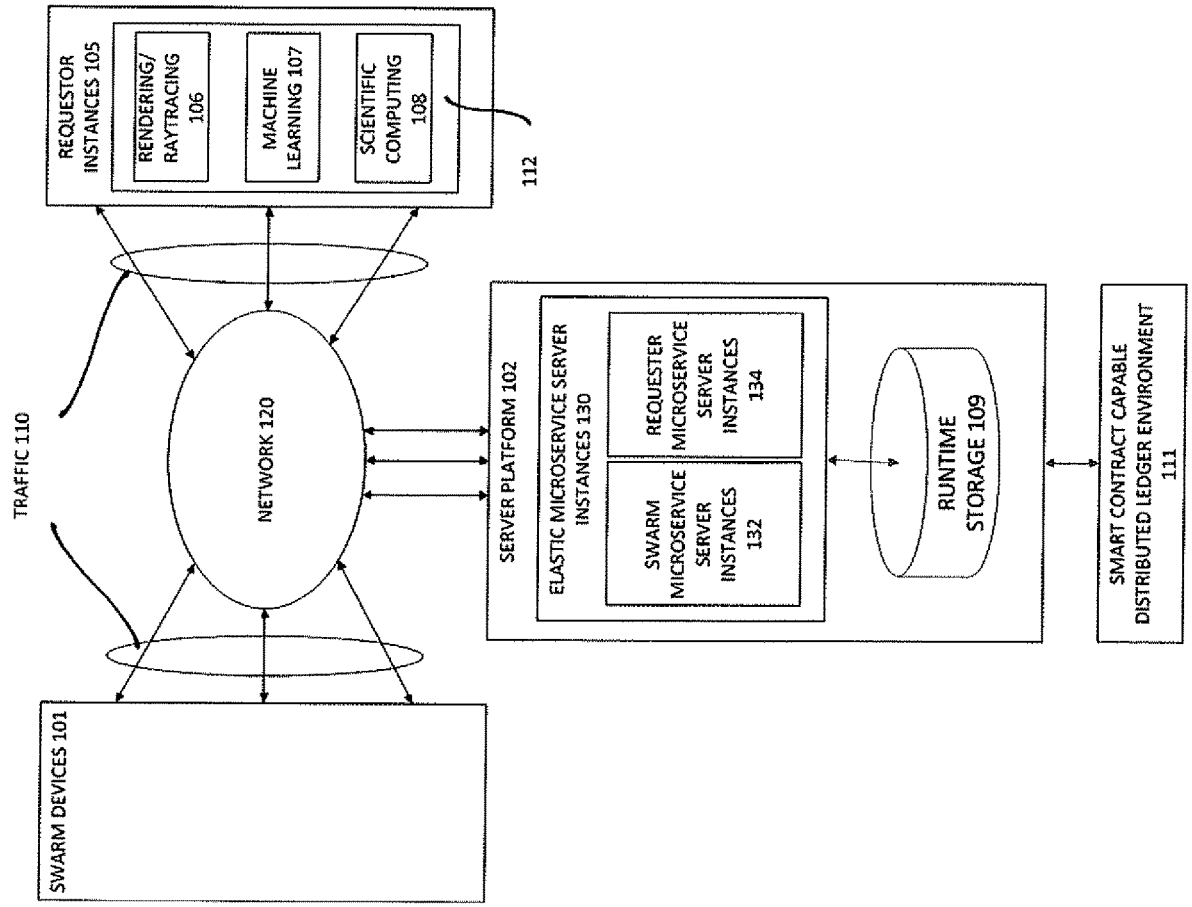
FIG. 1A illustrates one embodiment of a system and method for distributed computing.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 25 percent or less.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

The system and method detailed below harnesses the standards described previously that allow for significant hardware acceleration of code executed by readily available commercial web browsers, in order to perform distributed computing with a swarm of web-enabled devices such as, but not limited to, modern video consoles, smartphones, tablets, laptops, and PCs. As mentioned previously, these web-enabled devices make up the fastest growing sector of computational devices. The system and method detailed below exploits these web enabled gadgets for distributed computing, so as to fully exploit the potential capabilities of these web enabled gadgets. By utilizing capabilities that are readily available in commercially available web browsers, this enables the creation of web applications or apps with less effort and at a lower cost than with the specialized frameworks detailed in the prior art.

FIG. 1A depicts one embodiment of this system and method. Swarm devices 101 are, for example, video gaming consoles, smartphones, tablets, laptops, and PCs. In one embodiment, swarm devices 101 run web apps on WebGL-enabled browsers which are able to access GPU or similar specialized hardware on the swarm devices 101, to enable the operation of the system and method described below.

One of skill in the art would know that the system and method detailed below is not limited to being run on browsers. In another embodiment, swarm devices 101 run applications or apps to enable the operation of the system and method described below. This is used by, for example, a telecommunications company to enable the operation of the system and method described below.

These are coupled via a network 120 to server platform 102. Network 120 may be implemented in a variety of ways. For example, in one embodiment, network 120 comprises one or more subnetworks. In other embodiments, network 120 is implemented using one or more types of networks known to those of skill in the art. These types of networks include, for example, wireless networks, wired networks, Ethernet networks, local area networks, metropolitan area networks and optical networks. Network 120 is capable of running protocols known to those of skill in the art such as Hypertext Transfer Protocol (HTTP), and Hypertext Transfer Protocol Secure (HTTPS).

The use of swarm devices 101 for distributed computing is coordinated by the means of the server platform 102. Server platform 102 can be implemented in a variety of ways. In one embodiment, it is implemented using commodity hardware. In one embodiment, server platform 102 is implemented using a clustered implementation. The description that follows relates to this clustered implementation. Server platform 102 comprises a plurality of elastic microservice server instances 130 coupled to runtime storage 109. Additionally, server platform 102 has one or more clocks. In some embodiments, at least one of the one or more clocks are synchronized to clocks running on each of the swarm devices.

In one embodiment, elastic microserver server instances 130 comprise requestor microservice instances 134 and swarm microservice instances 132. The swarm microservice server instances 132 work to manage and communicate with swarm devices 101. Requester instances 105 communicate with and are managed by the requester microservice server instance 134. In one embodiment, swarm microservice server instance 132 and requestor microservice server instance 134 are distributed across one or more servers or computers.

Server platform 102 functions as an elastic web server to swarm devices 101. An elastic server is a server that can scale dynamically with the demand placed on it. The elastic web server capability is enabled by the plurality of elastic microservice server instances 130 coupled to runtime storage 109. Individual server instances from plurality 130 are spawned dynamically as demand grows. This is the mechanism by which server platform 102 scales. This will be explained in further detail below.

The elastic microservice server instances 130 rely on runtime storage 109. In one embodiment, runtime storage 109 scales with the number of spawned microservice server instances. In a specific embodiment, runtime storage 109 scales approximately linearly with the number of spawned microservice server instances. This is accomplished with horizontal scaling and appropriate load balancing, i.e. new nodes with additional RAM are added on demand as the load increases, and subsequently released when no longer needed.

Traffic 110 comprises incoming traffic received by, and outgoing traffic sent from, server platform 102. It comprises, for example,
- workload requests and workloads received from requestor instances 105;
- subtasks distributed to swarm devices 101;
- completed result sets received from swarm devices 101; and
- completed computational results sent to requestor instances 105.

A reverse web proxy architecture dynamically allocates the incoming portion of traffic 110 arriving via network 120 to a port such as port 80 of server platform 102 which is then sent to the plurality of elastic micro-server instances 130. An example for a reverse proxy architecture to use for such a configuration would be, for example, the NGINX web server. For the embodiment detailed above, the NGINX web server is configured for load balancing. Another example of a reverse proxy product that offers the required functionality is Pivot Cloud Foundry. The microservice instances 130 are implemented using, for example, any socket based framework such as node.js. In some embodiments, the microservice instances 130 are optimized for performance with a compiled language such as C++ or Go.

In some embodiments, at least some of the traffic 110 is either digitally signed or encrypted prior to transmission using cryptographic techniques known to those of skill in the art. This includes the portion of traffic 110 which travels between the swarm devices 101 and the server platform 102. These cryptographic techniques comprise, for example:
- asymmetric cryptographic techniques;
- symmetric cryptographic techniques; and
- combinations of asymmetric and symmetric cryptographic techniques.

In some embodiments, techniques based on shared secrets are used to either digitally sign or encrypt traffic. A method based on shared secrets is detailed further below.

In some embodiments, the elastic microservices server instances 130 are deployed within a containerized environment such as, but not limited to, Docker Swarm. In other embodiments, the elastic microservices server instances 130 are distributed in a more conventional fashion using cluster management software such as, but not limited to, Apache Mesos.

In one embodiment, the server platform 102 is implemented on dedicated cluster hardware. In an alternative embodiment, the system and method is built on dynamically scaling cloud services offered by commercial cloud infrastructure providers such as, but not limited to, Amazon Web Services (AWS) or International Business Machines (IBM) Bluemix. For instance, a microservices architecture built on Docker Swarm could be deployed with either of these cloud service providers. It is possible to use these commercial cloud offerings since swarm devices 101 constitute a cloud, that is, a shared pool of configurable computing resources and data which are provided on demand. Then server platform 102 offers ubiquitous and on-demand access to swarm devices 101.

In addition to the above, server platform 102 takes in workload requests associated with workloads 112, and the workloads 112 themselves from requestor instances 105 via network 120. Server platform 102 then distributes the workloads 112 to swarm devices 101 for processing. These workloads 112 comprise, for example, a rendering/raytracing task 106, a machine learning task 107 and a scientific computing task 108. Rendering/raytracing task 106 comprises tasks such as, but not limited to, large scene or animation sequence rendering. Scientific computing task 108 comprises tasks such as, but not limited to, diagonalization of matrices, calculating eigenvalues, calculating the trace or determinant of matrices and multiplication of matrices. In one embodiment, these requests are routed through network 120, and follow a suitable protocol, for instance, the Web Remote Procedure Calls (WebRPC) protocol.

Figure 1B:
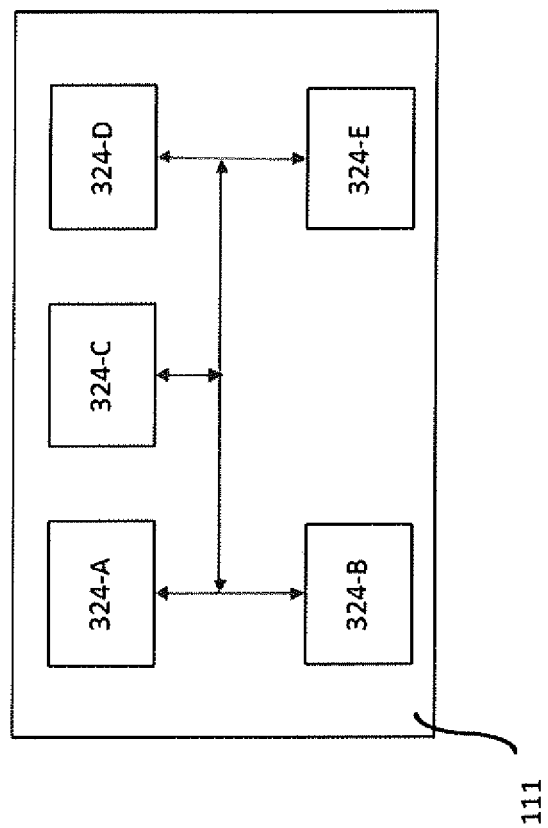
FIG. 1B illustrates an example embodiment of a smart contract capable distributed ledger environment.

Smart contract capable distributed ledger environment 111 is, for example, a blockchain environment such as an Ethereum environment. In one embodiment this is a peer-to-peer (P2P) distributed data ledger. Smart contract capable distributed ledger environment 111 is shown in more detail in FIG. 1B. In FIG. 1B, smart contract capable distributed ledger environment has interconnected nodes 324-A to 324-E. One of skill in the art would know that this is a representative diagram and there may be more or less nodes than shown in FIG. 1B.

Blockchain technology can remove the need for trusted settlement intermediaries in certain transactions. In a blockchain environment, all prior transactions are recorded in blocks on ledgers distributed across a network of servers, known as nodes. When new transactions are entered, the transaction is validated using cryptographically secure algorithms that confirm the accuracy of the blocks stored on each of the nodes. If the transaction is validated against the existing blocks, it is executed, and a new block of executed transactions is added to the chain. Once a new block is added to the chain, it cannot be reversed. This immutability, plus the distribution of records across a number of nodes, makes it possible to transact without an intermediary. In some embodiments, blockchains support self-executing agreements, known as smart contracts, capable of automating payments and data deliveries based on pre-programmed instructions. In some embodiments, blockchains are public. An example of a public blockchain is the one that underlies Bitcoin trading. In other embodiments, blockchains are partially decentralized, that is, they are open to the public but only to permissioned users that satisfy prescribed standards. In other embodiments, they are private, that is, where a single intermediary or group of pre-permissioned users may operate the network. The immutability, resilience and data integrity of this technology provides a temper proof, permanent audit and authorization record of the requestor tasks executed by the swarm environment.

Figure 1C:
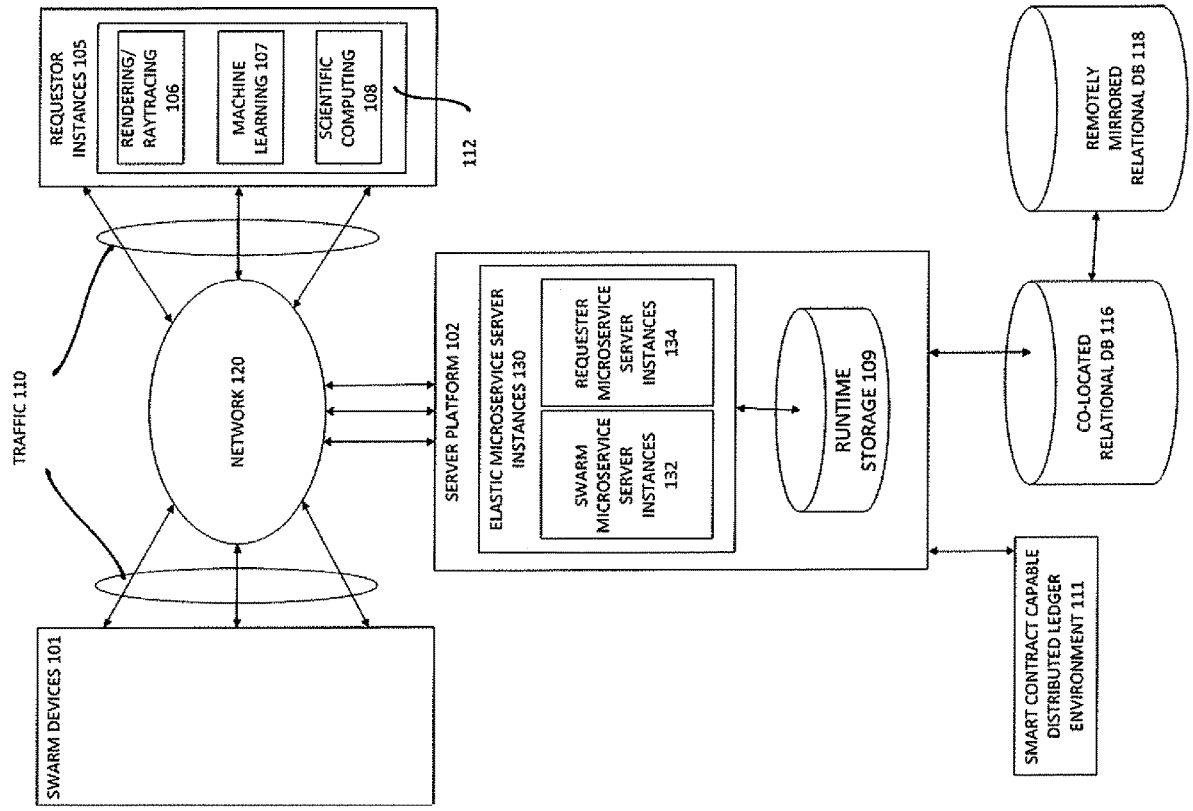
FIG. 1C illustrates another embodiment of a system and method for distributed computing.

FIG. 1C shows another embodiment of the system and method. In the embodiment shown in FIG. 1C, the components of FIG. 1C are identical to those shown in FIG. 1A with the exception of adding additional relational DB servers 116 and 118. DB server 116 is co-located with the server platform 102, and DB server 118 is geographically separated from DB server 116 but configured so as to mirror co-located DB server 116.

DB servers 116 and 118 are used to intermediate between the data recorded in the smart contract capable distributed ledger environment 111, such as a blockchain environment, and the server platform's runtime storage 109. This addition serves two purposes. Using these DB servers facilitates faster read and write access than a typical Blockchain system. It also offers data cache capability. In some embodiments, it is used to anonymize any data kept in the smart contract capable distributed ledger environment 111, by maintaining a hash table and only storing the hash values rather than the actual data attributes in the immutable distributed ledger 111. This method is applicable to both public blockchain environments, such as, for example, the current Ethereum main trunk, and a private blockchain environment.

Figure 1D:
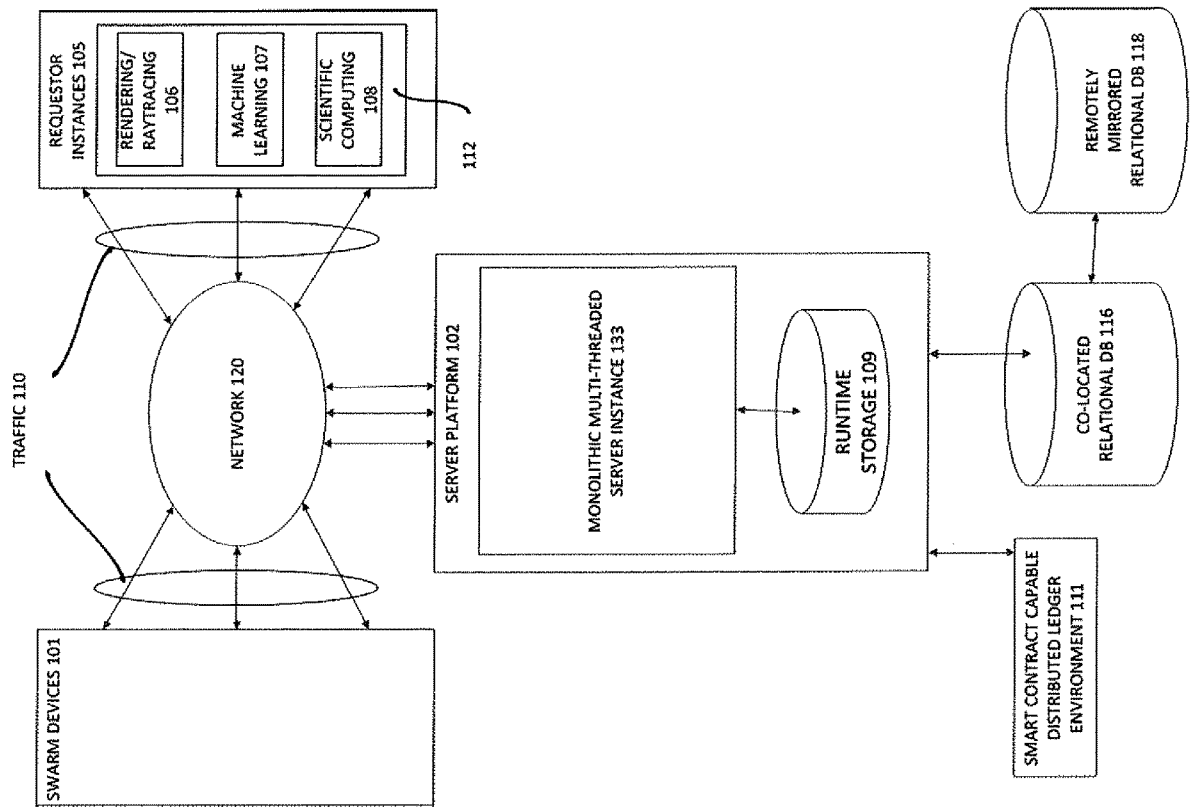
FIG. 1D illustrates yet another embodiment of a system and method for distributed computing.

The above represents some exemplary embodiments where server platform 102 is implemented in a clustered fashion. Other embodiments are also possible for server platform 102. For example, in another embodiment server platform 102 is implemented using a monolithic server design. In one embodiment, this is a monolithic single multi-threaded server instance 133 running on non-clustered server hardware as shown in FIG. 1D. Such an architecture preferably utilizes specialized hardware that can scale beyond ordinary commodity clusters. In some embodiments, server platform 102 utilizes special hardware, to perform, for example, optimal load balancing. Then, in some of these embodiments, server platform 102 uses special chip sets and technologies that aim to accelerate machine learning, for example, the Google Tensor chipset or D-Wave quantum annealers.

Figure 1E:
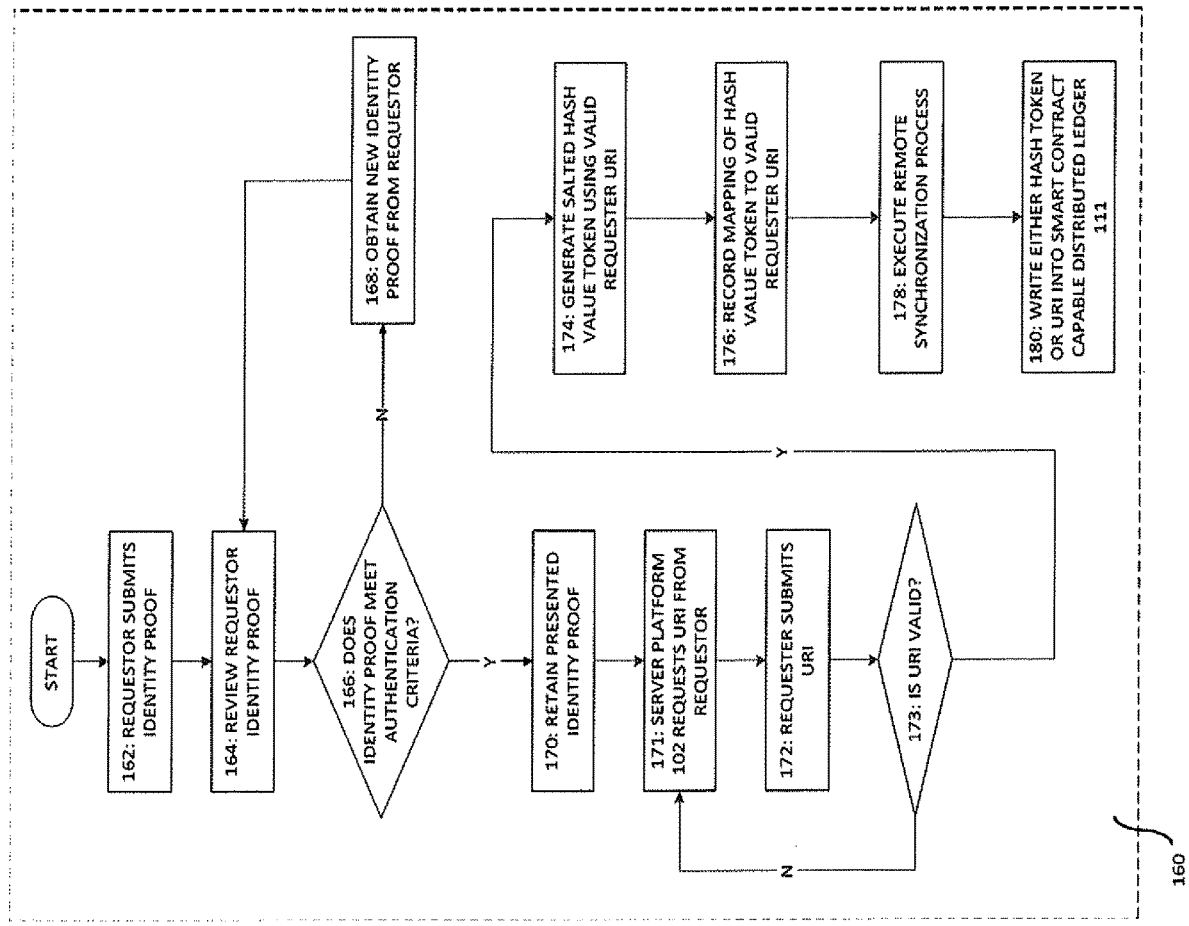
FIG. 1E illustrates an example embodiment of a requestor authentication process to validate a requestor's identity at onboarding.

Before the server platform 102 can receive workload requests associated with workloads 112 from the requestor, the requestor must first be onboarded. As part of this onboarding process, the requestor is authenticated as a valid entity. FIG. 1E shows an example embodiment of a requestor authentication process 160 to validate a requestor's identity at onboarding used with the system architectures shown in either FIG. 1C or 1D. In step 162, identity proof is submitted by a prospective requestor. Requestor identity proof comprises, for example, notarized documents. In step 164, the requestor identity proof is reviewed. This ensures that these documents do meet authentication criteria. Steps 162 and 164 are performed to verify the identity of the individual requesting access to the platform. In the case of institutional access, steps 162 and 164 are performed to ensure that an individual requesting access to the platform on behalf of an institution is in fact associated with the institution and has signing authority. In a further embodiment, this review process is performed within the context of a closed cryptographic chain. For example, an email signed with a valid Pretty Good Privacy (PGP) key of a known officeholder at a customer institution is used to represent a proper authentication document for identity proof.

If in step 166, it is determined that the presented identity proof does not meet certain authentication criteria, then in step 168 new identity proof is obtained from the requestor. If the presented identity proof does meet the authentication criteria in step 166, then in step 170 the requester identity proof is retained. In step 171 the server platform 102 requests a Uniform Resource Identifier (URI) from the requestor. In step 172 the requester supplies a URI. In step 173 the server platform 102 verifies the supplied URI as valid. In one embodiment this comprises checking whether the supplied URI connects to a website that is HTTPS-enabled. If it is invalid, then the process returns to step 171. If it is valid, in step 174 the server platform 102 generates a salted hash value token corresponding to the valid URI supplied by the requester and sends this salted hash value to the requester. In step 176, the mapping of the URI to this token is recorded in the relational DB server 116. The hash value will be kept as an index table record for best performance. In step 178, a remote synchronization process is executed in order to ensure recording in remote mirrored DB server 118. The relational DB system allows for redundancy to minimize any data loss risk. The remote synchronization process in step 178 ensures relational DB fail-over recovery, which comprises one or more fail-over and disaster recovery measures known to those of skill in the art. In step 180, either
  the hash token that has been generated; or
  the URI
is then written into smart contract capable distributed ledger environment 111, where it is then synchronized across the nodes 324-A to 324-E.

Using a hash value token such as explained above in FIG. 1E is especially advantageous in embodiments where smart contract capable distributed ledger environment 111 is a public blockchain. In these embodiments, it is preferable to store the hash token in smart contract capable distributed ledger environment 111 so as to preserve anonymity. This mitigates the risk of a Denial of Service attack against this URI which is especially important when smart contract capable distributed ledger environment 111 is a public blockchain.

At the conclusion of the onboarding process, the requestor is able to upload a workload into the location addressed by the valid URI. In a further embodiment, process 160 comprises an additional step of asking a requester for information to complete an authentication process such as a two-factor or three-factor authentication process.

As explained previously, a core function of the server platform 102 is to take in a workload request from a remote requestor instance 105, split the workload associated with the workload request using one or more task splitting algorithms and distribute the split-up workload to one or more of swarm devices 101 for processing.

Figure 2A:
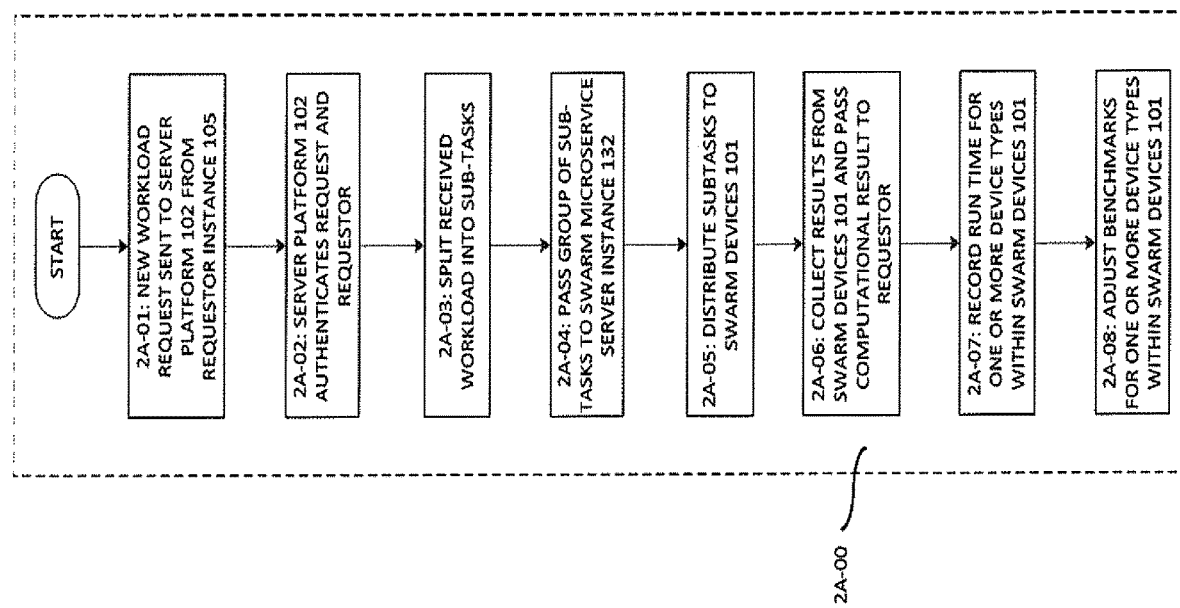
FIG. 2A illustrates an embodiment of a process to take in a workload request associated with a workload, split up the workload and distribute the split-up workload to swarm devices for processing.
Figure 2B:
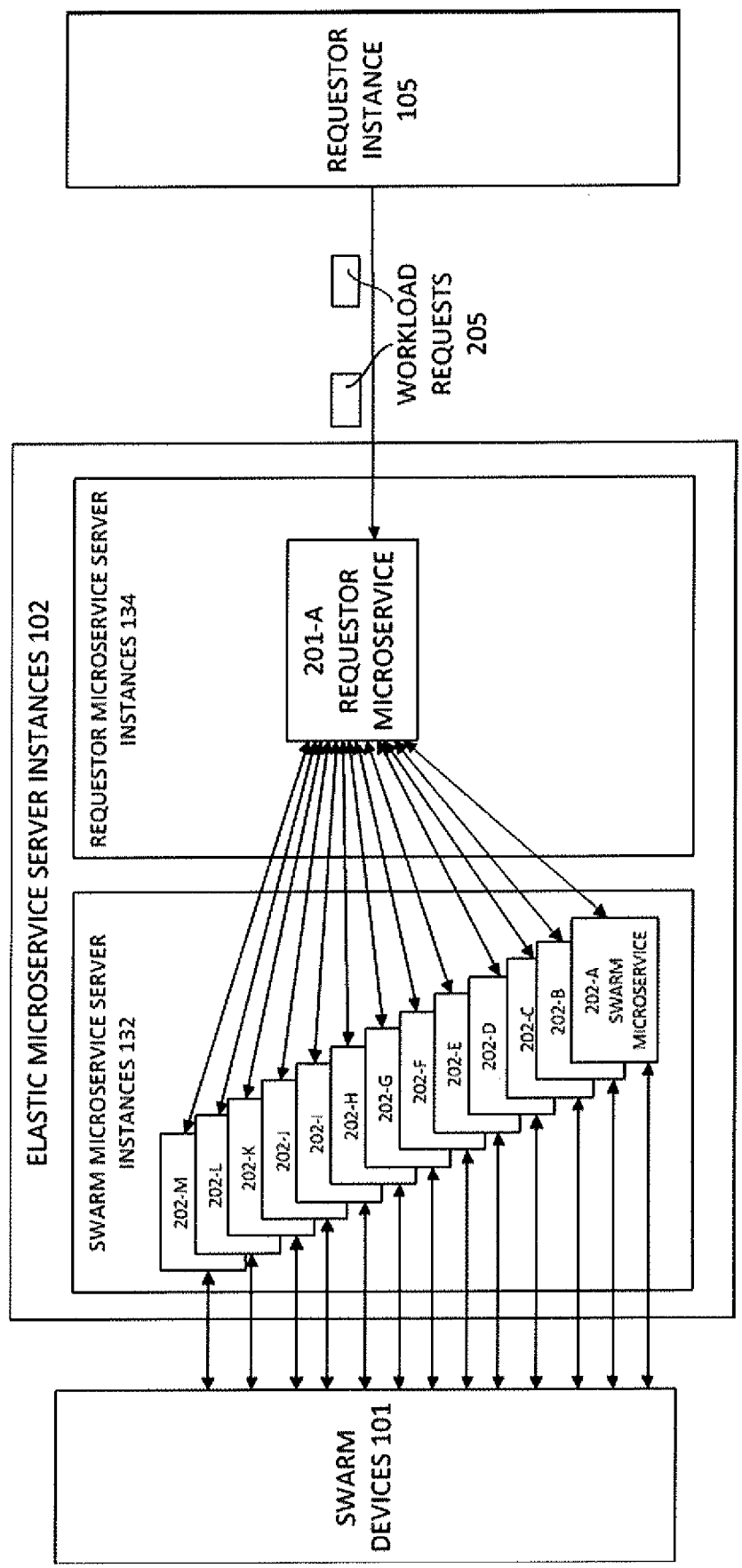
FIG. 2B illustrates an example of a requestor microservice and a plurality of swarm microservices to take in workload requests.

FIG. 2A shows an embodiment of a process 2A-00 to achieve this core function. In step 2A-01, a new workload request associated with one of workloads 112 is received by server platform 102 from a requestor instance 105. In one embodiment, this workload request comprises the hash code provided to the requester when the requester first went through onboarding as explained above. This request is received by a requestor microservice which is part of requestor microservice server instance 134. As explained above, the process of sending requests follows a suitable protocol, for instance, the Web Remote Procedure Calls (WebRPC) protocol. An example is shown in FIG. 2B. Requestor microservice 201-A is part of requestor microservice server instance 134 and receives workload requests 205 associated with workloads 112 from requestor instance 105. As depicted in FIG. 2B, in some embodiments, only one requestor microservice such as 201-A is used to handle the incoming traffic from a requestor instance such as requestor instance 105 of FIG. 1A.

As shown in FIG. 2B requestor microservice 201-A is associated with swarm microservices 202-A to 202-M. In one embodiment, swarm microservices are spawned in response to the number of swarm devices 101 connecting to server platform 102. This is an illustration of the elastic web server capability of server platform 102 as mentioned above. Each of swarm microservices 202-A to 202-M are associated with at least one of swarm devices 101. In one embodiment, this association changes over time such that a swarm device which, for example, was at one time, associated with swarm microservice 202-A associates with a different swarm microservice at another time. This embodiment corresponds to a many-to-one swarm microservice to requestor microservice configuration. In one embodiment, the assignment of swarm microservices to swarm devices is performed when a swarm device connects to the server platform 102. As will be explained further below, this is based on, for example, geographic location.

In some embodiments, requestor microservices are spawned in response to an increase in the number of workload requests 205 submitted to server platform 102. This is an illustration of the elastic web server capability of server platform 102 as mentioned above.

Figure 3:
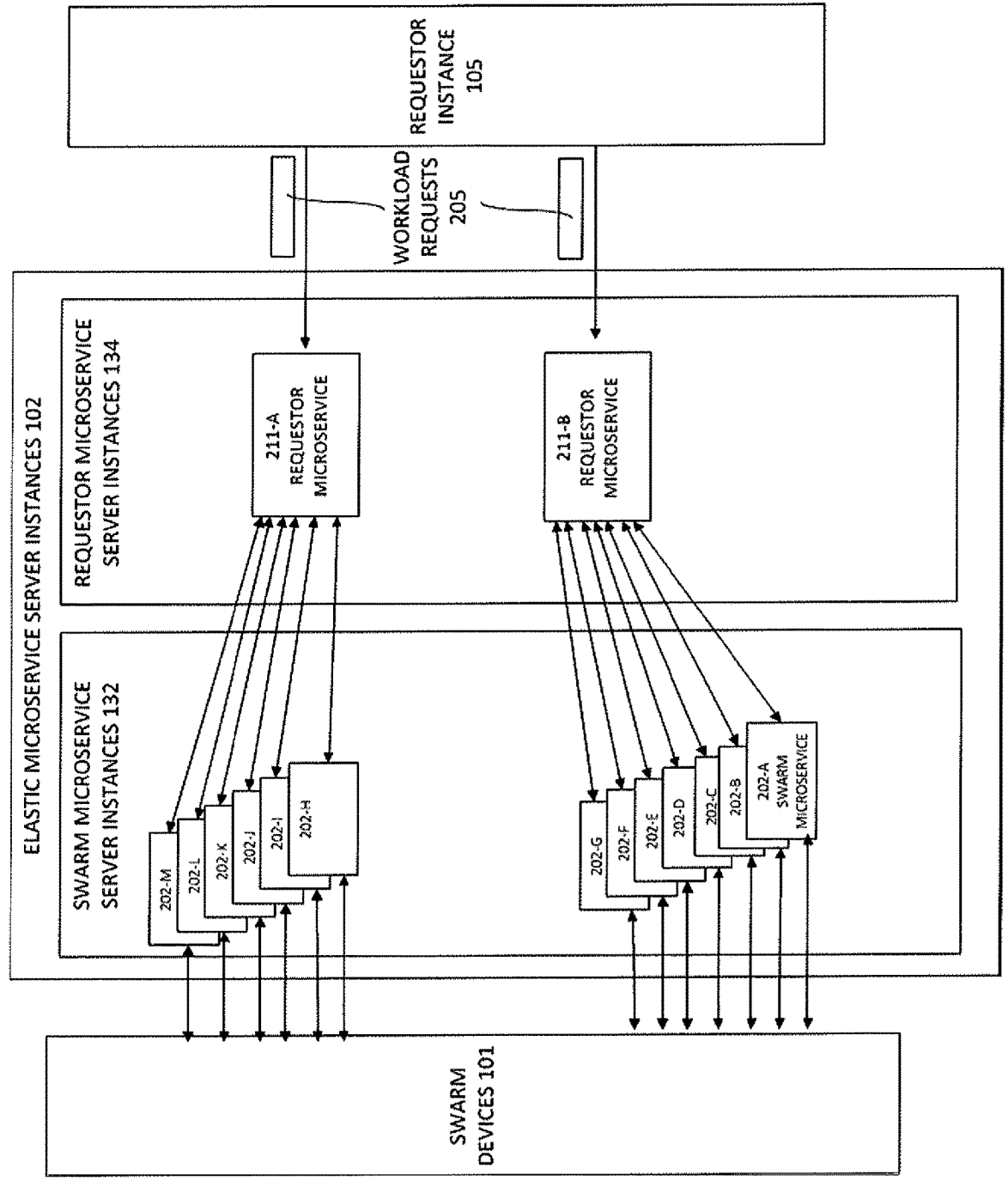
FIG. 3 illustrates an example of a plurality of requestor microservices and a plurality of swarm microservices to take in workload requests.

In some embodiments, when the swarm devices associated with microservices 202-A to 202-M take in data faster than the transfer rate that only one requestor microservice 201-A can provide, additional requestor microservices are spawned up for the same requesting instance as depicted in FIG. 3. In FIG. 3 requestor microservice 211-B is spawned in addition to requestor microservice 211-A. Then microservices 202-A to 202-M are partitioned such that requestor microservice 211-A is associated with swarm microservices 202-A to 202-G; and requestor microservice 211-B is associated with swarm microservices 202-H to 202-M. This embodiment corresponds to a many-to-many swarm microservice to requestor microservice configuration. In a further embodiment, the requestor microservices implement coordination logic to identify and handle the partitioning of the data that they receive from the requestor instance, the details of which will be specific to the implemented parallelizable algorithms.

In one embodiment, prior to submitting one of the workload requests 205, server platform 102 requests further authentication from the requester. This is performed by, for example,
requesting "something you know" such as entry of a username and a password. Such a username and a password are provided at the conclusion of requester authentication process 160,
requesting "something you are" such as biometric identification, and
requesting "something you have" such as a card number or a token.

Haphazard spawning of swarm microservices is a potential waste of resources. In order to avoid haphazard spawning of swarm microservices, in one embodiment, swarm microservice server instances 132 comprises a load balancing processor. This load balancing processor serves to optimize the usage of the existing swarm microservices before a new one is spawned by, for example, changing the association dynamically as mentioned above. In another embodiment, requestor microservice server instances 134 similarly comprise a load balancing processor to optimize the usage of the existing requestor microservices before spawning new requestor microservices.

In step 2A-02, server platform 102 authenticates the request to ensure that only safe code payloads have been submitted and only authorized customers are submitting computational jobs.

In step 2A-03, after authentication the workload associated with one of the workload request 205 is downloaded by requestor microservice 201 from the valid URI submitted by the requestor and split into a group of sub-tasks. This is performed using, for example, a secure protocol such as HTTPS. In one embodiment, requestor microservices are spawned in response to the size of the workload as explained previously. The workload is then split by requestor microservice server instance 134 into a group of sub-tasks for each swarm device within swarm devices 101 before being passed to swarm microservice server instance 132. The splitting into the group of sub-tasks is performed using one or more task splitting algorithms. Splitting can be performed by
the requestor microservice; or
a combination of the requestor microservice and the swarm microservice associated with the requestor microservice.

In one embodiment, the requestor pre-splits the workload prior to sending the workload request. These pre-splits may be temporal or logical based on parameters supplied within the URI.

In one embodiment, the workload associated with one of the workload requests 205 is split up into a group of subtasks after the requestor microservice 201-A queries the associated swarm microservices 202A to 202M for load sizing details. An example is described below: Referring to FIG. 1A, in the embodiment where requestor instance 105 submits a workload comprising a task such as a scientific compute job 108, a workload split is performed by requestor microservice 201-A after querying the swarm microservice server instance 132 for load sizing details. The load sizing details depend on the overall performance characteristics of the device swarm segment handled by the associated swarm microservices 202A through 202M. For example, each of swarm microservices 202A to 202M supplies details of the memory and processing power of the at least one swarm device associated with that swarm microservice. In one embodiment, the requestor microservice performs the split so as to minimize time differences between arrivals of different result sets from each of the swarm devices 101.

In one embodiment, the requestor microservice 201 implements internal logic to split up a submitted compute job. In some embodiments where more than one swarm device is associated with a swarm microservice, there are two stages of splitting. In the first stage, a requestor microservice such as requestor microservice 201-A splits the workload into a group of subtasks and passes each subtask to an associated swarm microservice, such as one of the swarm microservices 202A through 202M. Then each swarm microservice receives a subtask and splits the received subtask further into one or more portions. The splitting into the one or more portions is based on, for example, the memory and processing power of the swarm devices associated with the swarm microservice.

The implementation details differ between different kinds of requested tasks. For instance, for a requestor instance comprising rendering job 106, the requestor microservice 201 splits a large scene or animation sequence into segments. Then the group of subtasks comprises the segments for rendering. For other tasks, such as for scientific compute task 108 comprising the multiplication of two matrices, the requestor microservice 201 segments the large incoming matrix into sub-matrices sized for the computational profile of the swarm device set of each associated swarm microservice. Then the group of subtasks comprises the sub-matrices. The parallelizing strategies also differ between different numerical tasks.

Open source libraries that implement parallelization strategies for BLAS (Basic Linear Algebra Subprograms) are readily available. These include, for example, ScaLAPACK or the Combinatorial BLAS Library. In some embodiments, these libraries serve as reference designs for task splitting algorithms to split a BLAS workload submitted by a requestor microservice 201.

In one embodiment, the workload is split into a group of sub-tasks depending on the swarm devices 101 benchmarks. In one embodiment, benchmarks are set for a type of workload when that type of workload is first requested. In a further embodiment, benchmarks are set for each type of device within swarm devices 101. In yet another embodiment, benchmarks corresponding to different combinations of type of workload and type of device are set. A process to set and adjust benchmarks for new and unknown devices or types of workloads 112 will be detailed below.

Figure 4:
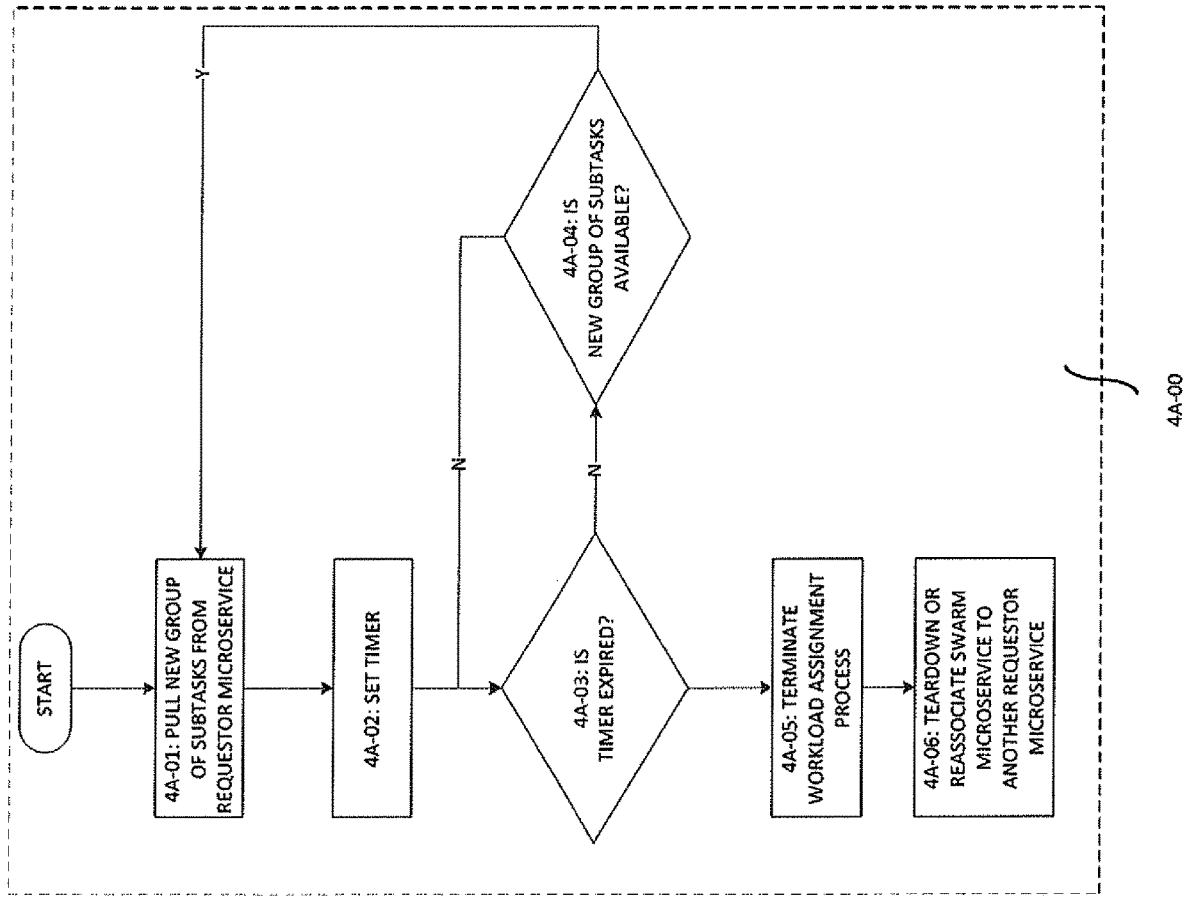
FIG. 4 illustrates an embodiment of a pull process that terminates with an adjustable timeout if no new groups of subtasks are available to be pulled.

In step 2A-04, the group of sub-tasks is then passed from requestor microservice instance 134 to swarm microservice server instance 132. This is explained with further reference to FIG. 2B. In FIG. 2B, in one embodiment each of swarm microservices 202-A to 202-M within swarm microservice server instance 132 constantly polls the requestor microservice 201-A for a new group of subtasks corresponding to a new received workload, so as to "pull" in a new group of subtasks. Then one or more subtasks within the group of subtasks is assigned to one of the swarm microservices. This is an example of a pull architecture. In one embodiment, a pull process that terminates with an adjustable timeout if no new groups of subtasks are available to be pulled is used. This is illustrated in process 4A-00 of FIG. 4. In FIG. 4, in step 4A-01 a new group of subtasks is pulled from the associated requestor microservice 201. A timer is then set in step 4A-02. If a new group of subtasks becomes available before the timeout expires (steps 4A-03 and 4A-04) then in step 4A-01 the new group of subtasks is pulled and the timer is restarted in step 4A-02. If no new group of subtasks are available before the timeout expires, the workload assignment process terminates in step 4A-05. In step 4A-06 the underlying swarm microservice is either torn down or reassociated to another requestor microservice.

In another embodiment, in step 2A-04 the requestor microservice 201-A "pushes" a new group of subtasks corresponding to a newly received workload request to swarm microservice server instance 132. This is referred to as a push architecture. In a further embodiment, in the case of a push architecture, there is a queue of groups of subtasks available to swarm microservice server instance 132. Then requester microservice 201-A sends new groups of subtasks to join the queue. Each of swarm microservices 202-A to 202-M then takes one or more subtasks from the queue corresponding to the number of swarm devices associated with the swarm microservice.

In step 2A-05, the subtasks are distributed from swarm microservice server instance 132 to swarm devices 101 for execution. In one embodiment, the swarm devices continually poll the swarm microservice server instances for new groups of subtasks. In one embodiment, execution is performed on WebGL enabled browsers running on swarm devices 101 as explained before. In another embodiment, execution is performed using apps running on swarm devices 101, as explained previously. In a further embodiment, execution is performed using web apps running on swarm devices 101, as explained previously.

In one embodiment, each of the swarm devices 101 pulls a subtask from the swarm microservice that it is associated with. In embodiments where the swarm microservice is associated with a swarm of web-enabled devices, the swarm microservice performs further splitting of the subtask into smaller portions, and each of the swarm devices pulls a portion from the swarm microservice. In a further embodiment, the sizes of the portions are based on the performance profiles of each of the swarm devices associated with the swarm microservice. Then each swarm device pulls a portion with a size fitting its performance profile. In one embodiment, this is achieved via the swarm microservice notifying each of the swarm devices to pull a portion with a size matching its performance profile.

In some embodiments, prior to distribution some preprocessing is performed by the swarm microservices to enable hardware accelerated execution of the subtasks by browsers or apps running on the swarm devices. For example, in one embodiment, each of the associated swarm microservices 202-A to 202-M are tasked with wrapping the subtask that is passed on to it with an ECMAScript encoding that allows for the most efficient execution of the sub-task on a swarm device. In one embodiment, the ECMAScript encoding is retrieved from a library stored on runtime storage 109. As mentioned above, ECMAScript allows the accessing of advanced APIs and web standards such as WebGL and WebAssembly, which are available on most commercial browsers. This ECMAScript code is then loaded and subsequently processed by browsers installed on the swarm devices 101 connected to the swarm microservice 202-A to 202-M. As also explained previously, this enables commercially available browsers which are WebGL-enabled to use this ECMAScript code to gain access to the GPU and significantly accelerate the performance of a group of subtasks on the swarm devices. In the embodiment above where the requestor microservice 201-A splits a large scene or animation sequence into segments, the pre-processing comprises the associated swarm microservices 202A to 202M encoding the segments as WebGL rendering tasks to be executed on the GPUs of the swarm devices 101.

In one embodiment, an associated swarm microservice that prepares a BLAS job to be distributed to a swarm device accommodates for the hardware limitations of these devices. For example, it implements methods that were originally designed for performing double and high precision float point calculations on devices that only facilitated 16-bit or shorter float point arithmetic on the hardware level. These methods typically use the fact that chain addition of float variables with limited bit width can represent arbitrarily long float values. Open Source reference implementations of these methods are readily available (such as the GNU MPFR C library).

In step 2A-06, one or more result sets and run time results are collected from swarm devices 101 by swarm microservices 202A to 202M and passed back either with or without further processing to the requestor microservice 201. The further processing comprises, for example, assembling the one or more results into a computational result for the requestor. Then requestor microservice 201 provides the computational result to requestor instance 105. In one embodiment, each of the swarm microservices 202-A to 202-M pull results from the swarm devices that they are associated with.

In step 2A-07, the run time is recorded for the one or more device types within swarm devices 101.

In step 2A-08, based on a comparison of the currently recorded run time with historical recorded run times, the benchmark for each of the one or more types of devices within swarm devices 101 is adjusted. In one embodiment, this adjustment is performed using the inverse run time. In an alternate embodiment, this adjustment is performed using more sophisticated heuristics such as machine learning algorithms to predict the performance characteristics of a swarm device as accurately as possible.

The above process outlined in FIG. 2A is intended as one exemplary embodiment. It would be known to those of skill in the art that variations are possible. For example, in one embodiment, the workload requests are not routed to separate ports. If they share the same port with the swarm device web requests, the load balancing instance redirects them internally to the requestor port of a microservice.

Figure 5A:
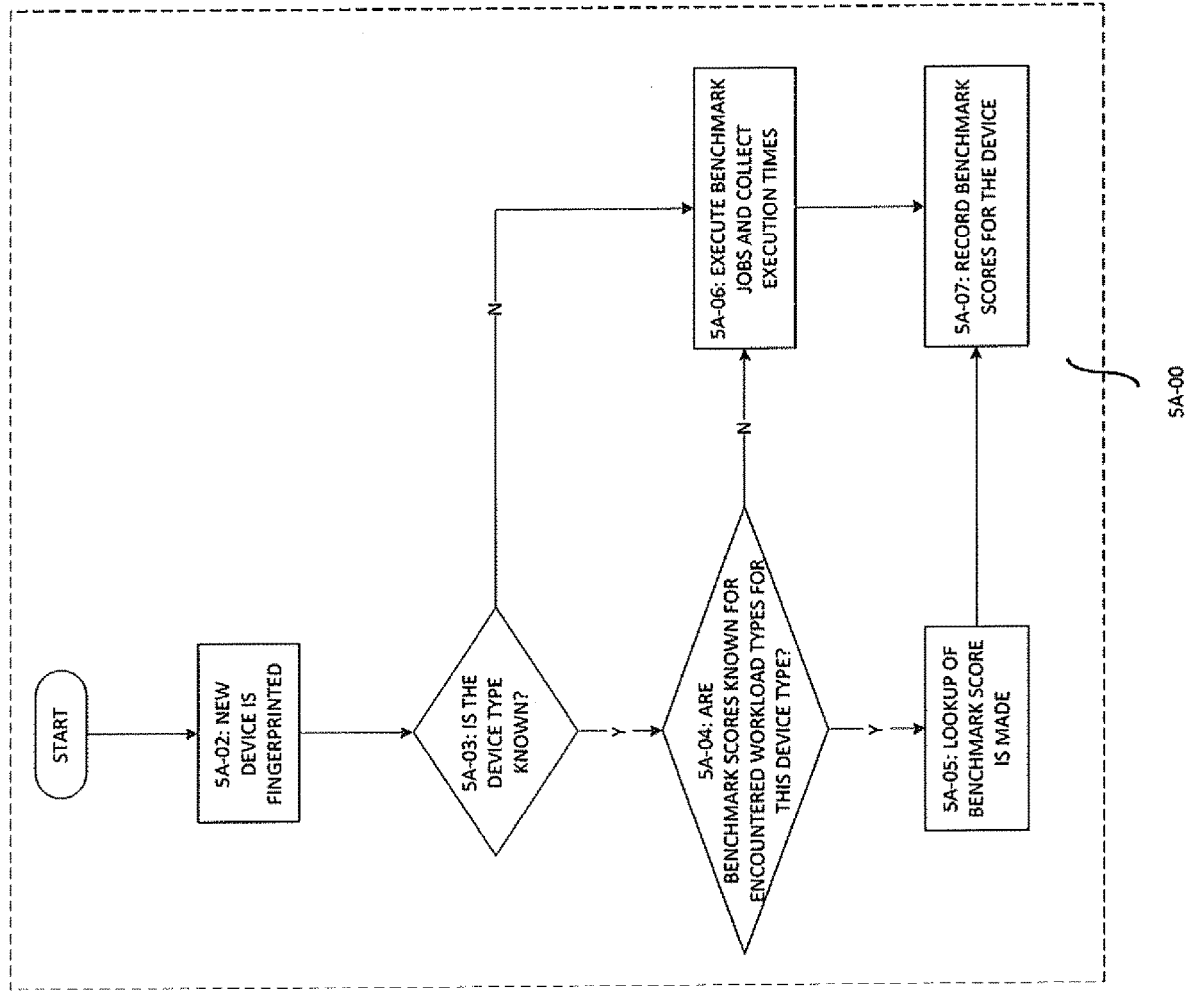
FIG. 5A illustrates an embodiment of a method to record a performance profile.

The above process outlined in FIG. 2A is for a workload where historical benchmarks are known, and the swarm devices 101 have all been inducted. FIG. 5A illustrates an embodiment of a method 5A-00 to record a performance profile which has to occur every time a new swarm device is inducted into the disclosed system.

In step 5A-01, a determination is made as to whether a new unclassified swarm device or workload type has been presented. In step 5A-02, if a new device is encountered it is checked to see if it has been fingerprinted. In one embodiment, this comprises searching for previous fingerprints. If it has not been fingerprinted, then one or more device fingerprinting routines known to those of skill in the art are employed. In one embodiment, some of these one or more routines rely on the site-specific persistent data stored within the device's web browser. Site-specific persistent data comprises data such as browser cookies. It is a well-known problem of fingerprinting routines that they will occasionally lead to false results, that is, swarm devices that have been connected and classified before may not be recognized as such. This could arise because, for example, a different browser has been used on the swarm device. This leads to a misidentification as a new swarm device.

In some embodiments, hardware based methods as to prevent misidentifications of swarm devices are also used. For example, smartphones have International Mobile Equipment Identity (IMEI) identification numbers. Personal computers and laptops have Media Access Control (MAC) addresses. By using these unique hardware identifiers, the server platform is able to prevent misidentification of the swarm device.

In step 5A-03, the device is inspected to see whether it is a unknown device type, or a type that has been previously encountered. In one embodiment, this involves checking to see whether a previous record for the same make and model exists.

If the device type is known, then in step 5A-04 a check is performed to see whether the benchmark score is known for the workload type for that device type.

If in step 5A-04 the benchmark score is known for the workload type for that device type, then in step 5A-05 a lookup of the benchmark score is made. In one embodiment, this benchmark score is calculated as the inverse of execution time for the workload type.

If in in step 5A-03 it is determined that the device type is not known because, for example, a previous record for the same make and model does not exist; or in step 5A-04 it is determined that a benchmark score is not known for the workload type, because the workload has never been classified for the kind of device; then the swarm device needs to be benchmarked.

In step 5A-06, different benchmark jobs are drawn from a benchmark test suite and executed on the new device. The processing execution time for each of these jobs is collected. In one embodiment, this involves collecting Central Processing Unit (CPU) and Graphical Processing Unit (GPU) execution times.

In step 5A-07, after either the benchmark score was looked up in step 5A-05 or the execution times had been collected in step 5A-06, then scores are recorded. In one embodiment, if the execution time had been collected in step 5A-06, then in step 5A-07 the benchmark for the device type is calculated. In one embodiment this involves calculating the inverse of the run time. In one embodiment, benchmark scores for that particular type of device are recorded for each previously encountered workload type. In another embodiment, benchmark scores are recorded for each device that needed to be benchmarked.

Figure 5B:
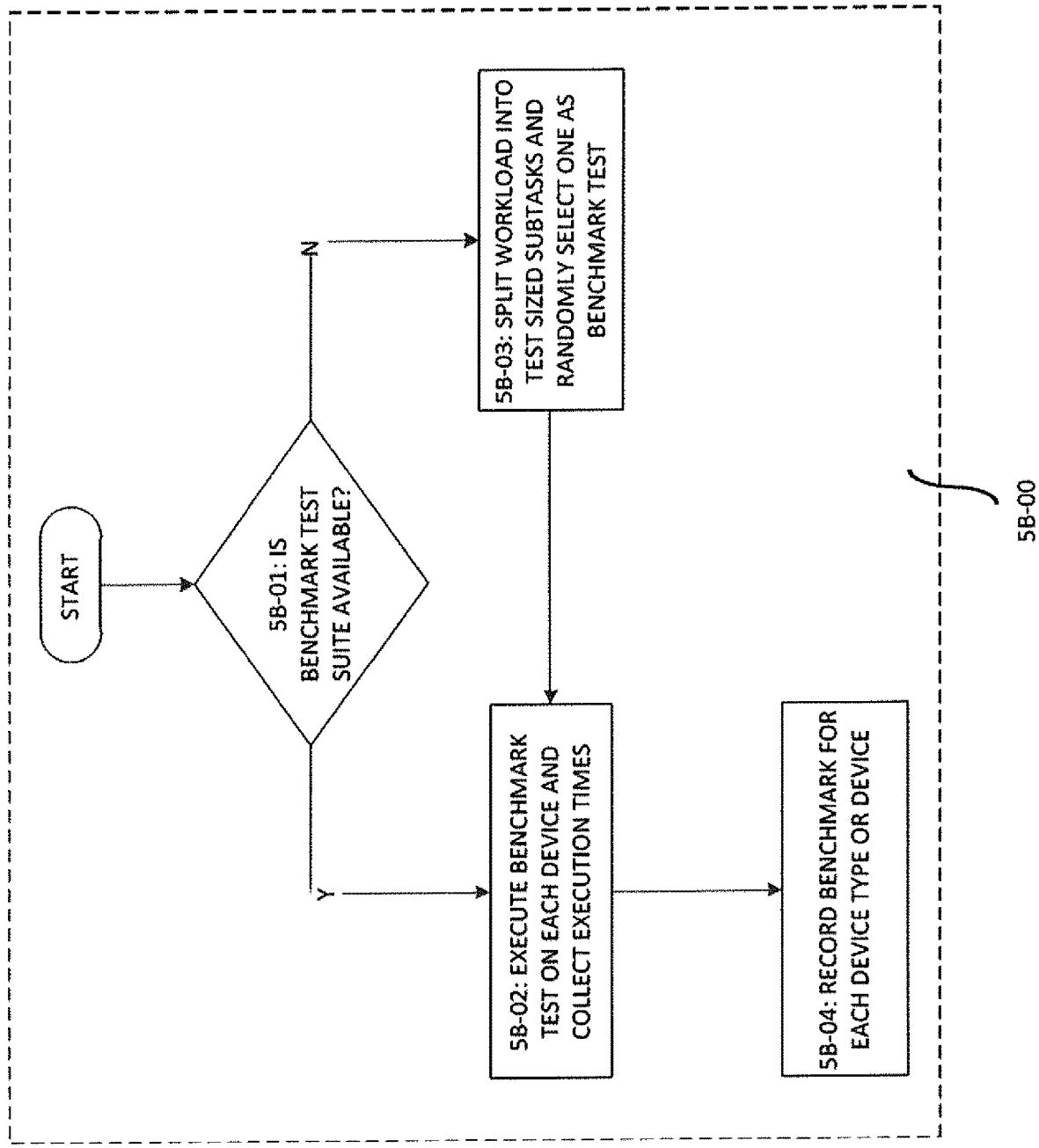
FIG. 5B shows an embodiment of a process when a new workload is accepted that does not fall into an previously known type or category.

FIG. 5B shows an embodiment of a process 5B-00 when a new workload is accepted that does not fall into an previously known type or category. In step 5B-01 a determination is made to see if a benchmark test suite for different types of workloads 112 is available. In one embodiment, this involves checking to see whether the requestor has provided a test benchmark suite, and requesting a benchmark suite if none has been provided. In another embodiment, this involves checking publicly available test suites to find a suitable benchmark test suite.

If no such benchmark test suite is available, in step 5B-03 the submitted workload is split in the same manner as for a production run, but only one of the tasks that the workload is split into will be randomly selected as a test benchmark job, and subsequently submitted to all devices that need to be benchmarked. In one embodiment, the selection is performed based on a pseudo-random technique.

In step 5B-02, if a benchmark test suite is available or a benchmark job was selected after the splitting of the workload, then the benchmark test is executed on each device that needs to be benchmarked and execution times are collected. In one embodiment, this involves collecting Central Processing Unit (CPU) and Graphical Processing Unit (GPU) execution times.

In step 5B-04, benchmarks are then calculated and recorded. In one embodiment, benchmark scores for that particular type of workload are recorded for each device type within the devices that need to be benchmarked. In another embodiment, benchmark scores are recorded for each device that needed to be benchmarked.

As explained previously, in some embodiments the portion of traffic 110 of FIG. 1A which travels between swarm devices 101 and server platform 102 is either digitally signed or encrypted so as to ensure safety and mitigate the risk of man-in-the-middle attacks. As explained previously, either asymmetric cryptographic techniques, symmetric cryptographic techniques or some combination of symmetric and asymmetric cryptographic techniques are used.

In one embodiment, in order to facilitate either digital signature or encryption, key exchange between the swarm devices 101 and the server platform 102 is performed. In one embodiment, it is initially performed over an HTTPS channel on port 443, to then establish a standard cryptographic authentication scheme. In another embodiment of this method, if relying on an external Secure Sockets Layer (SSL) certification authority is not desired, a key exchange mechanism such as, but not limited to, the Diffie-Hellman protocol is used.

In one embodiment, a hardware-based shared secret scheme is used to generate a symmetric key for either encrypting or digitally signing the portion of traffic travelling between the swarm device and the server platform.

In one embodiment, the scheme is implemented using a security device. This security device is, for example, a hardware token.

In another embodiment, the scheme is implemented using a "smart charger". A smart charger is a charger which implements a digital handshake protocol and utilizes a digital connector. An example of such a digital handshake protocol is disclosed in U.S. Pat. No. 9,444,278 B2 to Baurle, filed Apr. 25, 2014 and issued on Sep. 13, 2016. Digital connectors include cables such as, but not limited to, a USB cable.

Figure 6A:
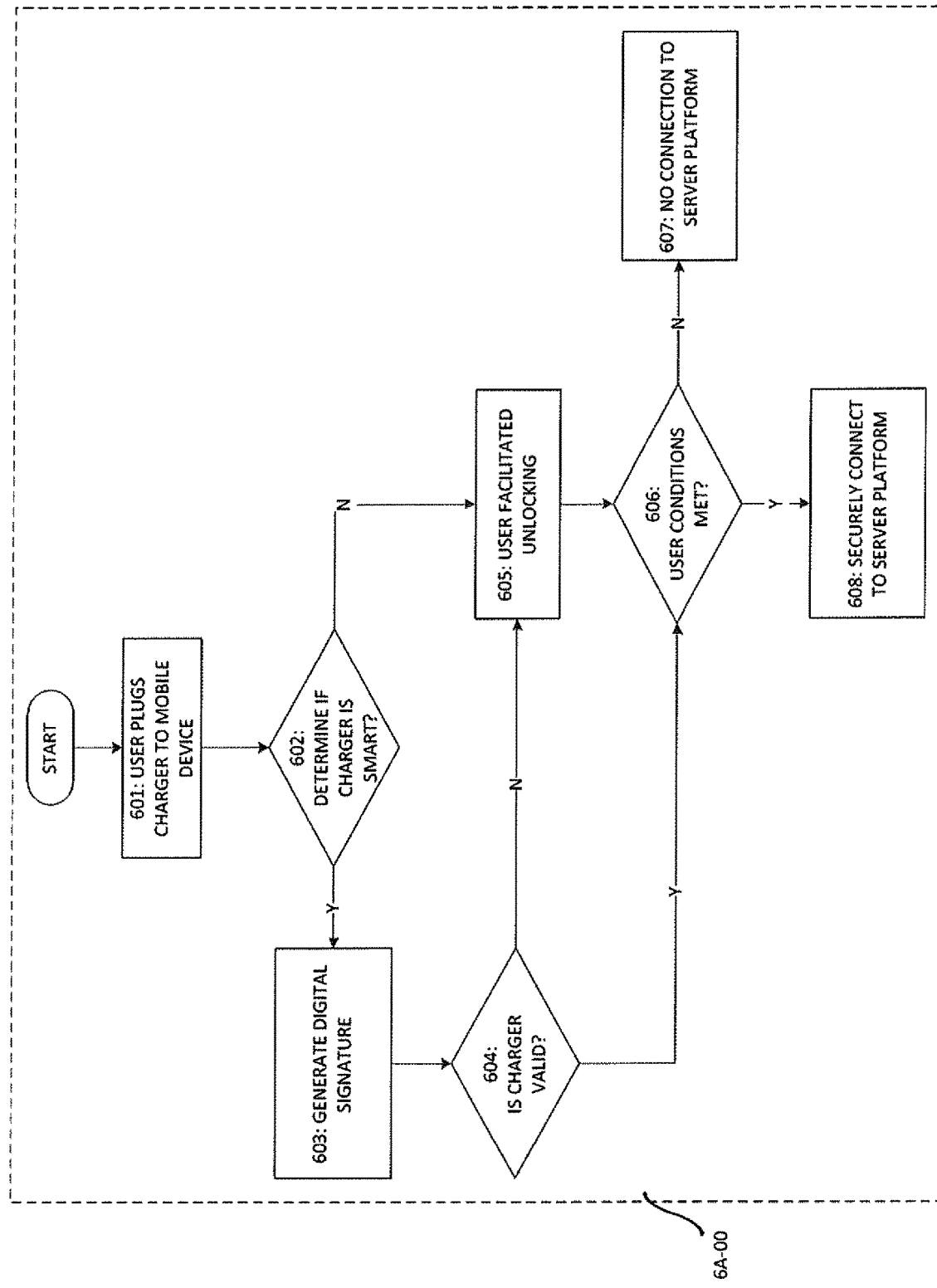
FIG. 6A illustrates a process showing the usage of a smart charging device as a hardware dongle to unlock and restrict certain features of an attached swarm device when a smart charger is detected.

FIG. 6A illustrates process 6A-00 concerning the usage of a smart charging device as a hardware dongle to unlock and restrict certain features of an attached swarm device when the smart charger is detected. In one embodiment, at the time of manufacturing of the smart charger, it is produced with a pre-specified seed, pseudo random number generator and random number refresh frequency. This pre-specified seed, pseudo random number generator and random number refresh frequency are shared by the server platform 102.

In step 601, the user plugs the charger into the swarm device. In step 602, a determination is made as to whether the charger is smart or not. If a suitable smart charger is detected, then in step 603 a digital signature is generated. In one embodiment, this protocol is hardware based so as to minimize the possibility of malware attack.

Figure 6B:
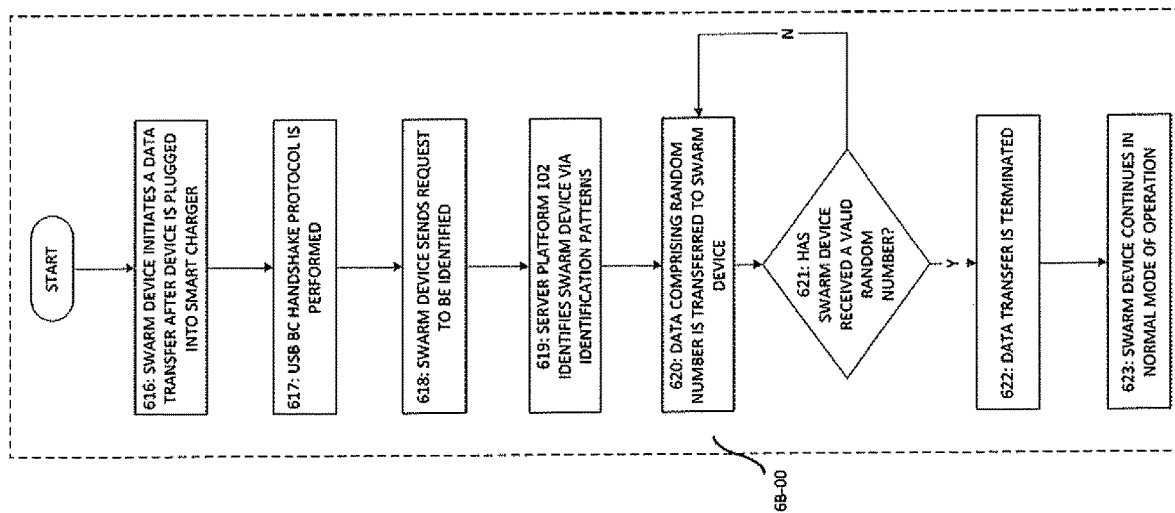
FIG. 6B demonstrates an embodiment for generation of a digital signature.

One embodiment for the digital signature generation method in step 603 is based on FIG. 5 of patent U.S. Pat. No. 9,444,278 B2, and further described in process 6B-00 in FIG. 6B. In FIG. 6B in step 616. the device initiates a data transfer after plug-in. In step 617, the USB Battery Charging (BC) handshake protocol is performed. In one embodiment, as part of this handshake protocol a random number is generated in the following manner.

As explained previously, both the server platform 102 and the smart charger share the same seed and pseudo random number generator. The smart charger obtains a time from the swarm device it is connected to. As explained previously, the server platform 102 clock is synchronized to the swarm device, and the server platform 102 also obtains a time from its clock. Since the swarm device clock and server platform 102 clock are synchronized, the server platform 102 obtains the same time as the smart charger.

Based on the seed and time obtained, the smart charger and server platform 102 generate a random number using the pseudo random number generator. In one embodiment, the smart charger and server platform 102 first calculate a time difference. This time difference is used together with the seed to generate a random number. The smart charger and server platform 102 generate the same random number, since both have the same seed, the same time, and the same pseudo random number generator.

Then in step 618, the swarm device sends a request to the server platform 102 to be identified.

In step 619, the server platform 102 identifies the swarm device via identification patterns. In an embodiment, upon completion of identification, the server platform 102 determines which of the swarm microservices 132 to assign the swarm device to. This is based on, for example, geographic location or load on each swarm microservice.

The swarm device is now ready to receive data from the charger, and in step 620 the swarm device begins receiving the random number from the smart charger.

In step 621, the swarm device determines whether it has received a valid random number having an expected length. In one embodiment, determining the validity of the random number depends on the encryption protocol being used and what kind of error correction method is applied to the random number. When the swarm device determines in step 621 that it has received a valid random number, it terminates the data transfer in step 622. Otherwise in step 620 the data transfer continues. Once the data is submitted, in step 623 the device continues in normal mode, and the random number received from the charger is used as salt in a hash function to compute a hash output. A digital signature based on the computed hash output is then used to authenticate data submitted from the swarm device to the server platform 102. The server platform 102 is able to verify that this hash is correct since it possesses the same random number.

Returning to FIG. 6A, in step 604, a determination is made as to whether the charger is valid. In one embodiment, this comprises checking whether the generated digital signature is valid. The smart charger is only accepted as valid in step 604 if this generated digital signature is valid.

Figure 6C:
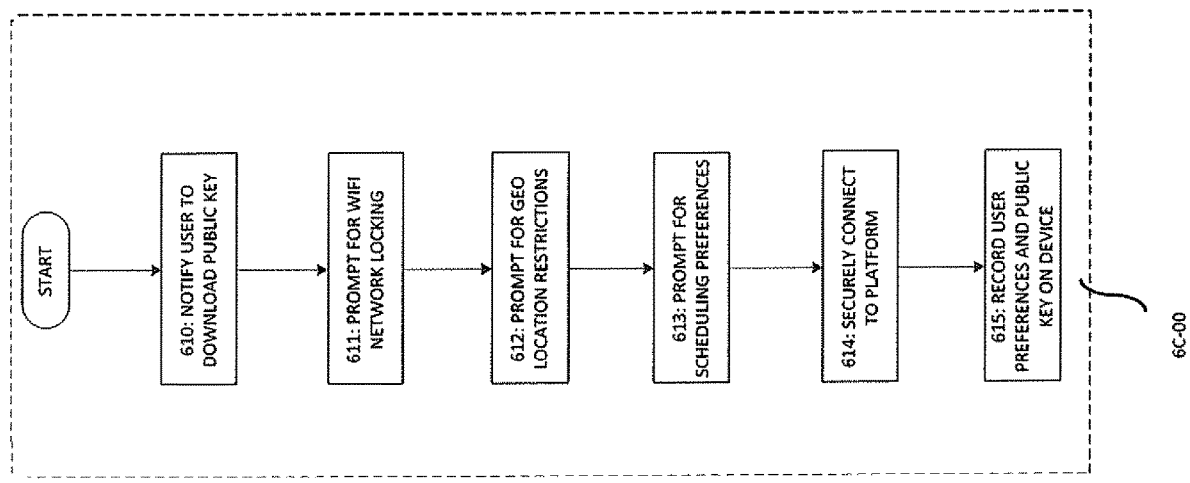
FIG. 6C illustrates an exemplary embodiment of a process for user facilitated unlocking and restricting certain features of one of the swarm devices.

If the smart charger is determined to be invalid, then in step 605 the user must facilitate unlocking by downloading a public key from server platform 102 to, for example, enable the use of an asymmetric cryptographic scheme where the server platform 102 holds a private key. FIG. 6C describes an exemplary embodiment of a process for user facilitated unlocking and restricting certain features of one of the swarm devices 101. In particular. FIG. 6C illustrates a possible embodiment of the user interface (UI) logic employed to notify the user to authorize the unlocking. Prior to using the method as depicted in FIG. 6C, the user previously agreed to make his/her device available to the platform for instance entering a device leasing agreement, and hence is not prompted for unlocking but rather given choices to set preferences as to when and how to make the device available. An alternative embodiment is given when it is up to the user's discretion to make the device available to the platform at all. This will typically also require a method that facilitates an individual payment scheme.

In process 6C-00 in FIG. 6C, when a user facilitated unlocking is initiated in step 609, then in step 610 the user is prompted to download a valid public key. In one embodiment, this key is used to sign the result sets that are sent back to the server platform 102. In another embodiment, this key is used to encrypt the result sets before sending the result sets back to server platform 102.

Once the key is downloaded, the user is prompted to select preferences as to when and where he or she wants to make the device available as a swarm device. For example, in step 611 the user is prompted to select whether the device is only inducted to the swarm when attached to a particular WiFi network. In step 612, the user is prompted to select whether geo-location restrictions will apply. In step 613, the user is prompted to select one or more scheduling preferences, for example only letting the device be available as a swarm device at certain hours of the day. In step 614, the user will securely connect to the platform. These preferences and the public key are locally recorded on the device in step 615.

Process 6C-00 represents one exemplary embodiment for user facilitated unlocking and restricting certain features of one of the swarm devices 101. Variations on the process described in 6C-00 are also possible. For example, in some embodiments, these preferences are made available to the user in a separate settings menu. In some embodiments one or more of steps 611-613 are omitted. In another embodiment, as the user selects preferences, the selected preferences are locally recorded on the device after steps 611-613 respectively.

Returning to FIG. 6A, in step 606, once a valid public key has been established, and all previously recorded user conditions as outlined in, for example, steps 611 to 613 of FIG. 6B have been met, then in step 608 the device connects securely to the server platform 102. If the user conditions are not met, no connection is established in step 607.

As an additional protection measure, once the device is authorized as a swarm device, then in one embodiment its networking capabilities are curtailed to only connect to authorized network endpoints of the server platform 102. This mitigates the possibility that these devices could be abused as a means to orchestrate a Denial of Service attack while serving as swarm devices. For example, one possible embodiment of this concept is that once authorized to connect, the DNS routing table of the device is programmatically altered to allow only connections to the host names associated with the server platform 102.

One of skill in the art would know that variations to the processes detailed above and in FIGS. 6A-6C are possible. In one embodiment, instead of digitally signing traffic sent from the swarm devices to the server platform, the traffic is encrypted based on the computed random number. In a further embodiment, the traffic is both encrypted and signed based on the computed random number.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for distributed computing using a plurality of swarm devices,
    wherein said plurality of swarm devices is web-enabled;
    said method further comprising:
    receiving, by a server platform, a workload request originating from a requestor, wherein said workload request is associated with a workload;
    receiving, by the server platform, the workload associated with the workload request;
    splitting, by said server platform, the received workload into a group of subtasks;
    distributing said group of subtasks to the plurality of swarm devices;
    collecting, by said server platform, one or more result sets from the plurality of swarm devices based on performing of said group of subtasks by said swarm devices;
    assembling said one or more result sets into a computational result; and
    providing, by said server platform, said requestor with the computational result.

2. The method of claim 1, further comprising performing preprocessing on said group of subtasks prior to said distributing,
    said preprocessing performed to enable hardware accelerated execution by either browsers or applications running on said plurality of swarm devices.

3. The method of claim 1, further comprising:
    receiving, by said server platform, a Uniform Resource Identifier (URI) from the requestor;
    storing, by said server platform, a record based on said URI using a distributed ledger; and
    wherein said receiving of workload is performed using said URI.

4. The method of claim 1, wherein
    said server platform is scalable; and
    said server platform comprises requestor microservices created when said requestor connects to said server.

5. The method of claim 4, further comprising swarm microservices created based on a number of said plurality of swarm devices connected to the server.

6. The method of claim 1, wherein
    said splitting is implemented using one or more task splitting algorithms; and
    said splitting is specific to the workload.

7. The method of claim 4, wherein
    said server platform is an elastic server; and
    said method further comprising creating a benchmark for each of the plurality of swarm devices, wherein said creating of the benchmark comprises recording an execution time of a test job.

8. The method of claim 7, wherein said test job comprises a subtask randomly selected from said group of subtasks.

9. The method of claim 7 further comprising
monitoring a subtask execution time for each of the plurality of the swarm devices; and
adjusting the benchmark for each of said plurality of swarm devices using data obtained from said monitoring.

10. The method of claim 1, further comprising restricting a connectivity of at least one of said plurality of swarm devices to mitigate the risk of malicious denial of service (DoS) attacks.

11. The method of claim 1, wherein one or more digital signatures are used to sign traffic sent from the plurality of swarm devices to the server platform to mitigate the risk of man-in-the middle attacks.

12. The method of claim 11, further comprising either
obtaining a key from a smart charger; or
downloading a public key.

13. A server platform for distributed computing, wherein
said server platform is coupled to a requestor and a plurality of swarm devices via a network,
further wherein said plurality of swarm devices is web-enabled; and
further wherein said server platform
receives a workload request originating from the requestor, wherein said workload request is associated with a workload,
receives the workload associated with the workload request,
splits the received workload into a group of subtasks,
distributes the group of subtasks to the plurality of swarm devices,
collects one or more result sets from the swarm of web-enabled devices based on performing of said group of subtasks by the swarm of web-enabled devices,
assembles said one or more result sets into a computational result, and
provides said requestor with the computational result.

14. The server platform of claim 13, further wherein the server platform performs preprocessing on said group of subtasks prior to said distributing,
said preprocessing performed to enable hardware accelerated execution by either browsers or applications running on said plurality of swarm devices.

15. The server platform of claim 13, further wherein said server platform
receives a URI from the requestor;
stores a record based on said URI using a distributed ledger; and
wherein said receiving of workload is performed using said URI.

16. The server platform of claim 13, wherein
said server platform is scalable, and
said server platform comprises requestor microservices created when said requestor connects to said server platform.

17. The server platform of claim 16, further wherein said server platform comprises swarm microservices created based on a number of said plurality of swarm devices connected to the server at any point in time.

18. The server platform of claim 13, wherein said server platform implements said splitting using one or more task splitting algorithms, and said splitting is specific to the workload.

19. The server platform of claim 16, wherein said server platform is an elastic server; and
said server platform creates a benchmark for each of the plurality of swarm devices, wherein said creating of the benchmark comprises recording an execution time of a test job.

20. The server platform of claim 19, wherein said test job comprises a subtask randomly selected from said group of subtasks.

21. The server platform of claim 19, further wherein
said server platform monitors a subtask execution time for each of said plurality of swarm devices; and
said server platform adjusts the benchmark for each of said plurality of swarm devices using data obtained from said monitoring.

22. The server platform of claim 13, further wherein a connectivity of at least one of said plurality of swarm devices is restricted to mitigate the risk of malicious denial of service (DoS) attacks.

23. The server platform of claim 13, wherein one or more digital signatures are used to sign traffic sent from the plurality of swarm devices to the server platform to mitigate the risk of man-in-the middle attacks.

24. The server platform of claim 23, further wherein at least one of said plurality of swarm devices either obtains a key from a smart charger; or
downloads a public key.

\* \* \* \* \*